United States Patent Office 3,383,805
Patented May 21, 1968

3,383,805
AIR-DRIVEN TURBINES
John William Powell, Poole, Dorset, England, assignor to Westwind Turbines, Ltd., Poole, Dorset, England
Filed Oct. 13, 1964, Ser. No. 403,615
Claims priority, application Great Britain, Oct. 24, 1963, 42,003/63
2 Claims. (Cl. 51—134.5)

This invention relates to air driven turbines and has as its object the provision of a turbine suitable, for example, for powering a grinding spindle, and in which the rotary part or parts of the turbine float on air bearings It is a further object of the present invention to provide a turbine of the kind stated in which the rotor is supported by a film of air, both radially and axially.

It is a further object of the invention to provide a turbine of the kind stated that utilises a simple reaction turbine drive that requires no expensive blade milling operation in its production.

According to the present invention the air driven turbine comprises a rotor, a head-piece on said rotor of greater diameter than the rotor, reaction jets in the rotor for causing the rotor to rotate, end thrust bearing surfaces on each side of the head-piece, one or more bearing surfaces surrounding the rotor, and means for maintaining an air bearing film between the head-piece and the thrust bearing surfaces on each side thereof, as well as an air bearing film between the rotor and the one or more bearing surfaces surrounding the rotor.

Preferably the head-piece on the rotor is formed with a plurality of arms extending away from the axis of the rotor, each arm having a bore therein that conveys air from an axially extending port in the head-piece to a reaction jet in each arm.

Figure 1:
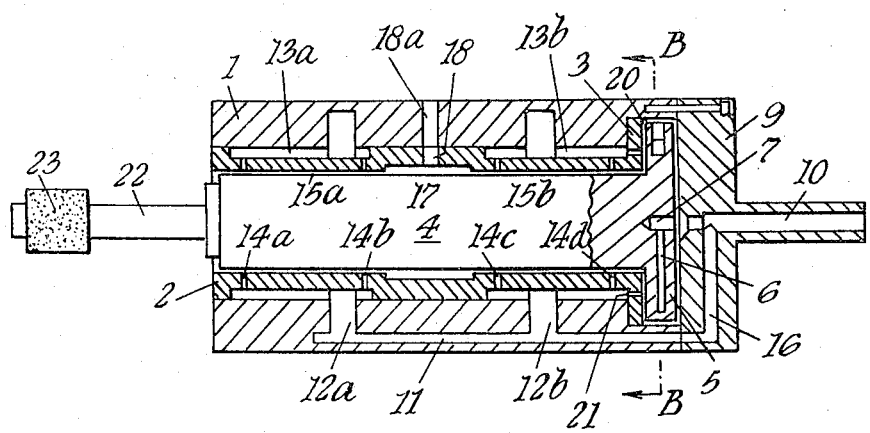
Figure 2:
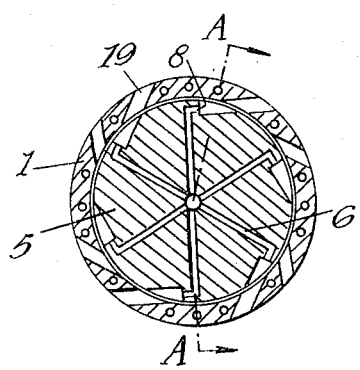

In order that the invention may be clearly understood, reference will now be made to the accompanying drawing showing, by way of example only, one particular embodiment of the present invention, and in which:

FIG. 1 is a sectional side elevation through a turbine constructed according to the present invention as taken along the line A—A of FIG. 2; and FIG. 2 is a cross section taken along the line B—B of FIG. 1.

The turbine comprises a housing 1 having a cylindrical bore in which is fitted a bearing sleeve 2, the bearing sleeve 2 being accurately located in the housing 1 by means of a radially extending flange 3 at the right-hand end of the bearing sleeve 2 abutting against a shoulder formed in the housing 1. This shoulder is formed by increasing the diameter of the bore at the right-hand end of the housing.

Rotatably mounted in the bearing sleeve 2, with a slight clearance, is a rotor 4, the rotor 4 being rigid with a head-piece 5 extending into the enlarged end of the bore.

The head-piece 5 is shaped as shown in FIG. 2 to provide a plurality of radially extending arms with air pockets therebetween, each arm being formed with a radially extending bore 6 leading from an axial port 7 to a jet 8, the jets 8 being directed into said air pockets to provide a reaction drive to the head-piece 5 and thus to the rotor 4.

The air pockets between the arms are formed by cutting the head-piece such that each arm has a radial or substantially radially extending front face through which the jet from said arm issues in a direction normal to said front face, and a rear face that is parallel or substantially parallel to the jet issuing from the next arm as measured in the direction of the rotation of the rotor. By cutting the arms in this manner each jet exerts a maximum thrust reaction on its own arm but has little effect on the rear face of the arm that follows it. For maximum turbine efficiency the size of the pocket should be as small as possible.

The right-hand end of the housing 1 is closed by an end plate 9, the head-piece 5 revolving with clearance between the end plate 9 and the radially extending flange 3. The head-piece 9 has an inlet port 10 communicating with the axial port 7 in the head-piece 5.

The housing 1 is formed with axially extending ports 11 communicating along their length with annular recesses 12a, 12b formed in the housing 1, said recesses leading into annular recesses 13a, 13b formed in the outer cylindrical surface of the bearing sleeve 2. Radial feed holes 14a, 14b, 14c and 14d, formed in the bearing sleeve 2, extend between the annular recesses 13a, 13b; and bearing clearance spaces 15a, 15b between the rotor 4 and the bearing sleeve 2.

The axially extending ports 11 are supplied with air via radially extending ports 16 formed in the end plate 9.

The bearing clearance spaces 15a, 15b communicate with an annular recess 17 formed in the inner cylindrical surface of the bearing sleeve 2. Radially extending ports 18 join the annular recess 17 to outlet ports 18a in the housing 1.

The housing 1 is also formed with a plurality of outlet ports 19 in the right-hand end containing the head-piece 5.

Between the head-piece 5 and the radially extending flange 3 is a front thrust bearing space 20, there being feed holes 21 between the annular recess 13b and the bearing space 20.

On a quill 22 extending from the rotor 4 is mounted a grinding wheel 23. Alternatively the nose of the rotor can be formed to accept a precision collet for holding mounted point grinding wheels.

In operation, air from a compressor passes through a filter and a pressure reducing valve and enters the turbine through a port 10 in the end plate 9. Some air leaving a conical outlet of the port 10 then flows radially outwards between the end plate 9 and the head-piece 5 to form an air thrust bearing to withstand axial loads on the rotor 4. The largest proportion of the air consumed by the rotor 4 flows from port 10 into the axial port 7. This air then flows radially outwards along the radial bores 6 and exhausts tangentially to the head-piece 5 through the jets 8 to provide a reaction turbine drive to the rotor 4. The turbine drive air finally leaves the turbine chamber through the exhaust ports 19. Air to feed the bearing spaces 15a, 15b and front thrust bearing 20 leaves the inlet port 10 and flows radially outwards along the ports 16 and then axially along the ports 11 to feed the annular recesses 12a and 12b formed between the housing 1 and the bearing sleeve 2. From these annular recesses the air flows radially inwards through the radial feed holes 14a, 14b, 14c and 14d into the journal bearing clearance spaces 15a and 15b.

Air from the rows of feed holes 14b and 14c flows axially into the annular recess 17 and exhausts radially through the ports 18 and 18a. Some air from the annular recess 12a flows axially through the feed holes 21 into the front thrust bearing space 20.

The advantages of an air driven turbine using air bearings are as follows:

(1) The air bearings increase the mechanical efficiency by reducing bearing power bosses.

(2) Improved surface finish is achieved due to the elimination of the vibration originating in ball or roller bearings.

(3) Since no bearing surface contact occurs, wear is negligible giving a long useful life.

(4) The flow of air exhausting from the bearings prevents the intrusion of harmful dust particles.

(5) The air journal bearings provide a much greater radial stiffness than could be achieved with ball or roller bearings.

(6) The air bearings do not demand a long "warming-up" period before accurate machining can commence as is demanded by existing grinding spindles with hydrostatic oil bearings or ball bearings.

It will be appreciated, moreover, that the mounting of the head-piece 5 at one end of the rotor 4 enables both journal bearings 15a, 15b to be ground or honed accurately in line so that bearings of small radial clearance and high radial stiffness can be produced.

In addition, the simple reaction driven head-piece described herein requires no expensive blade milling operation in its production.

The overall design is compact, simple and relatively inexpensive to produce.

I claim:

1. In an air driven turbine for powering a grinding spindle:
   - an elongated housing having a bore therethrough and a counterbore at one end;
   - an elongated bearing sleeve within said bore having an annular radial flange at one end nested in said counterbore defining an end air thrust bearing;
   - a rotor loosely journaled in said sleeve including an annular headpiece journaled in said counterbore and spaced from said end thrust bearing;
   - an end plate on said housing closing said counterbore and spaced from said headpiece defining a second end thrust bearing;
   - there being a pair of spaced exterior annular air supply recesses in said sleeve with radial air feed holes communicating with the sleeve bore;
   - and axial air feed holes through said bearing flange interconnecting an air supply recess with said counterbore on one side of said headpiece;
   - an axial compressed air inlet port in said end plate communicating with said counterbore upon the other side of said headpiece;
   - there being a series of interconnected radial and axial passages in said housing and end plate communicating with said bearing sleeve annular recesses;
   - and a reaction propulsion means in said rotor headpiece communicating with said air inlet port, with jet outlets communicating with the exterior of said housing;
   - by which the compressed air operates the propulsion means with some air being bled into the bearing sleeve bore and counterbore to define an air bearing film and an end thrust bearing film for said rotor.

2. In the turbine of claim 1, there being an internal annular air outlet recess in said bearing sleeve, and a communicating radial exhaust air outlet in said sleeve and housing.

References Cited

UNITED STATES PATENTS

| | | |
|---|---|---|
| 1,270,808 | 7/1918 | Franklin. |
| 2,756,115 | 7/1956 | Michel _____ 308 |
| 2,671,700 | 3/1954 | Seyffert. |

FOREIGN PATENTS

| | | |
|---|---|---|
| 9,683 | 6/1889 | Great Britain. |
| 17,730 | 8/1911 | Great Britain. |

HAROLD D. WHITEHEAD, *Primary Examiner.*